United States Patent
Orrico

(10) Patent No.: US 7,329,822 B1
(45) Date of Patent: Feb. 12, 2008

(54) SAFETY SWITCH ASSEMBLY

(75) Inventor: Mario M. Orrico, Chicago, IL (US)

(73) Assignee: Illinois Tool Works Inc, Glenview, IL (US)

( * ) Notice: Subject to any disclaimer, the term of this patent is extended or adjusted under 35 U.S.C. 154(b) by 0 days.

(21) Appl. No.: 11/724,862

(22) Filed: Mar. 16, 2007

Related U.S. Application Data

(60) Provisional application No. 60/811,886, filed on Jun. 8, 2006.

(51) Int. Cl.
*H01H 9/02* (2006.01)
(52) U.S. Cl. .................... 200/332.1; 200/345; 200/520
(58) Field of Classification Search ................ 200/573, 200/332.1
See application file for complete search history.

(56) References Cited

U.S. PATENT DOCUMENTS

| | | | |
|---|---|---|---|
| 4,419,555 A * | 12/1983 | Kim ........................... | 200/345 |
| 4,795,865 A | 1/1989 | Howard | |
| 4,803,316 A * | 2/1989 | Hayashi et al. ............. | 200/345 |
| 5,336,860 A * | 8/1994 | Slocum ................... | 200/332.1 |
| 5,446,252 A * | 8/1995 | Burger ....................... | 200/573 |

* cited by examiner

*Primary Examiner*—Renee Luebke
(74) *Attorney, Agent, or Firm*—Mark W. Croll; Paul F. Donovan

(57) ABSTRACT

A switch assembly includes a base, a flat spring, a switch, and an actuating member. The base includes a central channel. The flat spring may be pivotally secured to a portion of the base. The switch is proximate the flat spring, and is configured to selectively open and close a circuit, such as an ignition circuit of a vehicle. The actuating member is positioned through the central channel and abuts the flat spring. The actuating member is configured to be engaged toward the flat spring in order to activate the switch, wherein movement of the actuating member in a first direction causes the flat spring to move in a second direction into the switch to activate the switch. The first direction may be perpendicular to the second direction.

19 Claims, 4 Drawing Sheets

SAFETY SWITCH ASSEMBLY

RELATED APPLICATIONS

This application relates to and claims priority benefits from U.S. Provisional Patent Application No. 60/811,886 entitled "Seat Switch," filed Jun. 8, 2006, which is hereby incorporated by reference in its entirety.

FIELD OF THE INVENTION

Embodiments of the present invention generally relate to a safety switch assembly, and more particularly to a safety switch assembly that may be used with respect to vehicle seats for deactivating the vehicle if an operator is not properly seated.

BACKGROUND OF THE INVENTION

Various motorized vehicles are configured to automatically deactivate if an operator is not properly seated. For example, a riding lawn mower may be configured to deactivate if an operator moves off a seat. The deactivation of the vehicle prevents the operator and others from being injured by a runaway vehicle that is not being controlled by anyone.

U.S. Pat. No. 4,795,865, entitled "Safety Switch for Automatic De-Activation of A Motor Vehicle" (the "'865 patent") discloses a safety switch assembly that includes a cover that moves in response to the presence of a vehicle operator on the seat and an actuator that moves with the cover to open and close switch contacts inside an actuator housing. Movement of the cover forces the actuator to cause a torsion spring switch piece to bridge a gap between the contacts in a normally open switch and moves the switch piece from between the contract in a normally closed switch.

As shown in the '865 patent, the switch contacts 48 and 50 are, however, exposed. As such, if water or other liquids are spilled on the seat, the liquids may contact the exposed switch contacts. Moreover, the exposed switch contacts may be contaminated by deteriorating seat materials, such as foam within the seat.

Additionally, conventional switch assemblies may be susceptible to being stuck in an activated position. For example, an actuating member may be stuck in an activated position, such as if a spring member loses elasticity, or a portion of the actuating member is snagged by an internal feature of the assembly, even after an operator dismounts the vehicle. Thus, the vehicle may remain activated even when an operator is not positioned to control it.

Thus, a need exists for an improved seat switch assembly that does not include exposed switch contacts. Additionally, a need exists for a seat switch assembly with a lower mounting profile than existing seat switch assemblies. Further, a need exists for a fail-safe seat switch assembly.

SUMMARY OF THE INVENTION

Certain embodiments of the present invention provide a switch assembly that includes a base, a flat spring, a switch, and an actuating member. The base includes a central channel. The flat spring may be pivotally secured to a portion of the base. The switch is proximate the flat spring, and is configured to selectively open and close a circuit, such as an ignition circuit for a vehicle.

The actuating member is positioned through the central channel and abuts the flat spring. The actuating member is configured to be engaged toward the flat spring in order to activate the switch, wherein movement of the actuating member in a first direction causes the flat spring to move in a second direction into the switch to activate the switch. When the actuating member is disengaged, the flat spring returns to an at-rest position in which the flat spring moves into a deactivation position with respect to the switch. The first direction may be perpendicular to the second direction. For example, vertical movement of the actuating member may cause a portion of flat spring to move horizontally into the switch.

The flat spring may include an elongated beam integrally connected to a post which is, in turn, integrally connected to a bent clip. A distal tip of the elongated beam may be secured to a portion of the base. For example, the distal tip may be pinched, sandwiched, or otherwise trapped between a portion of the base and another structure, such as a cover. The bent clip may be secured to another portion of the base. The elongated beam bows in the first direction when engaged by the actuating member, thereby causing the post to rotate or otherwise deflect in the second direction into the switch. The elongated beam may taper toward the tip.

The switch assembly may also include a first cover secured to the base. The switch may be sealingly secured within a switch chamber defined between the base and the first cover.

The actuating member may include s a second cover secured to a washer. A coil spring may be positioned between the second cover and the base. The washer may include a central protuberance connected to a circumferential flap that is pivotally biased into the base. For example, the circumferential flap may be pivotally biased into interior edges of the base that define the central channel.

Certain embodiments of the present invention also provide a switch assembly that includes a base having a central channel, a first cover secured to the base, and a switch configured to selectively open and close an activation circuit. The switch may be completely disposed between the base and the first cover. The switch assembly may also include a spring member secured to a portion of the base, and an actuating member positioned through the central channel and abutting the spring member. The actuating member is configured to be engaged toward the spring member in order to urge a portion of the spring member into abutment with the switch, thereby activating the switch.

Certain embodiments of the present invention provide a switch assembly may be configured to be positioned within a seat of a vehicle. The switch assembly operates to activate operation of the vehicle when an operator is seated. Further, the switch assembly operates to deactivate operation of the vehicle when the operator dismounts from the seat

Figure 1:
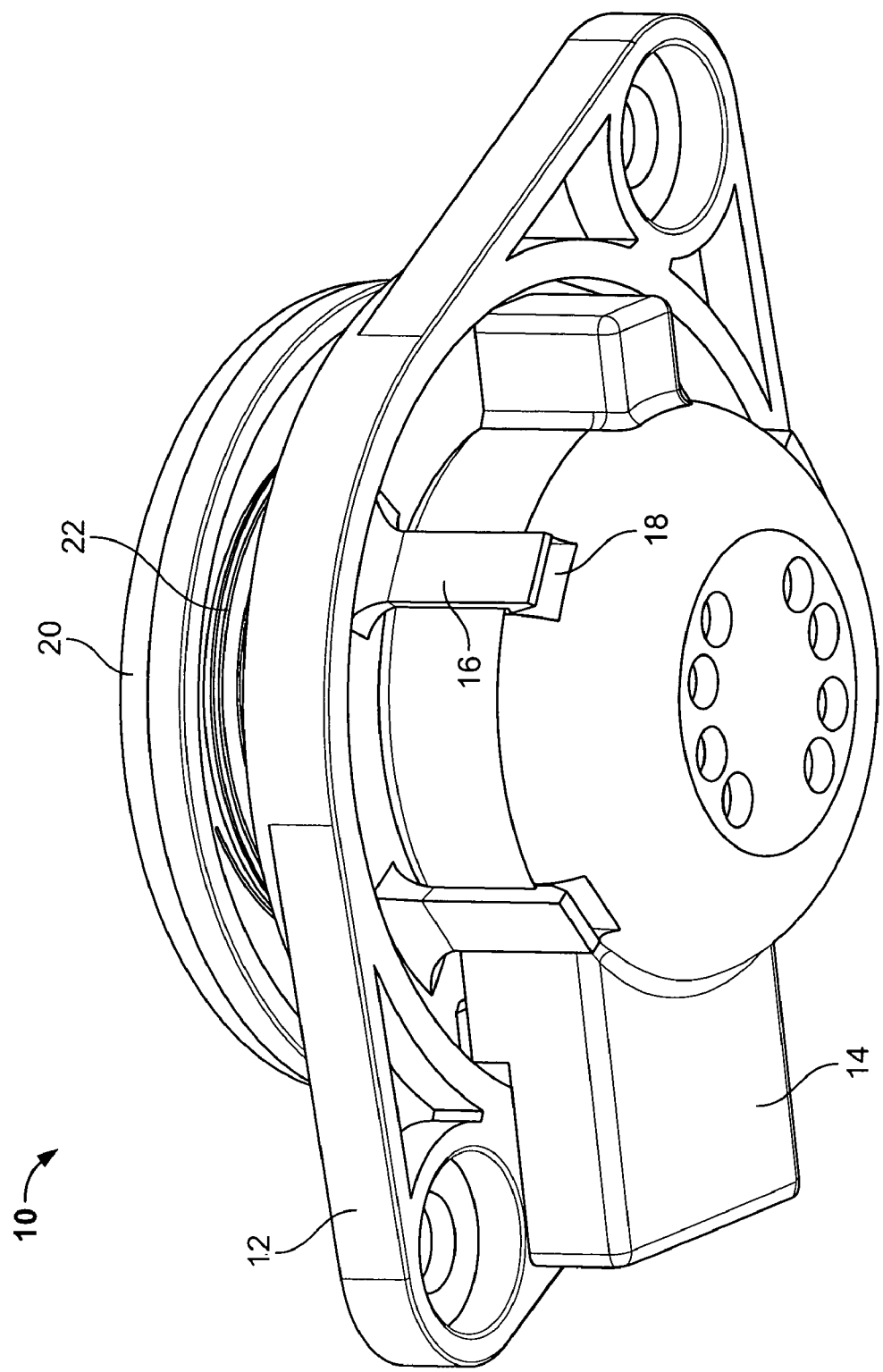
FIG. 1 illustrates an isometric bottom view of a seat switch assembly according to an embodiment of the present invention.

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF THE INVENTION

FIG. 1 illustrates an isometric bottom view of a seat switch assembly 10 according to an embodiment of the present invention. The seat switch assembly 10 is configured to be positioned within a vehicle seat and connected to an ignition circuit of the vehicle. The switch assembly 10 may be used with various vehicles and machines that are configured to be controlled by an operator.

The seat switch assembly 10 includes a base 12 secured to a bottom cover 14. The base 12 may snapably secure to the bottom cover 14 through beams 16 that snapably secure to, or within, reciprocal features, such as slots or channels 18, formed in the bottom cover 14. Optionally, the base 12 may secure to the bottom cover 14 through latches, clasps, screws, bolts, bonding, glue, and the like.

A top cover or button 20 is also secured to the base 16, as discussed with respect to FIG. 2 below. A coil spring 22 is disposed between an underside of the top cover 20 and a top surface of the base 12.

Figure 2:
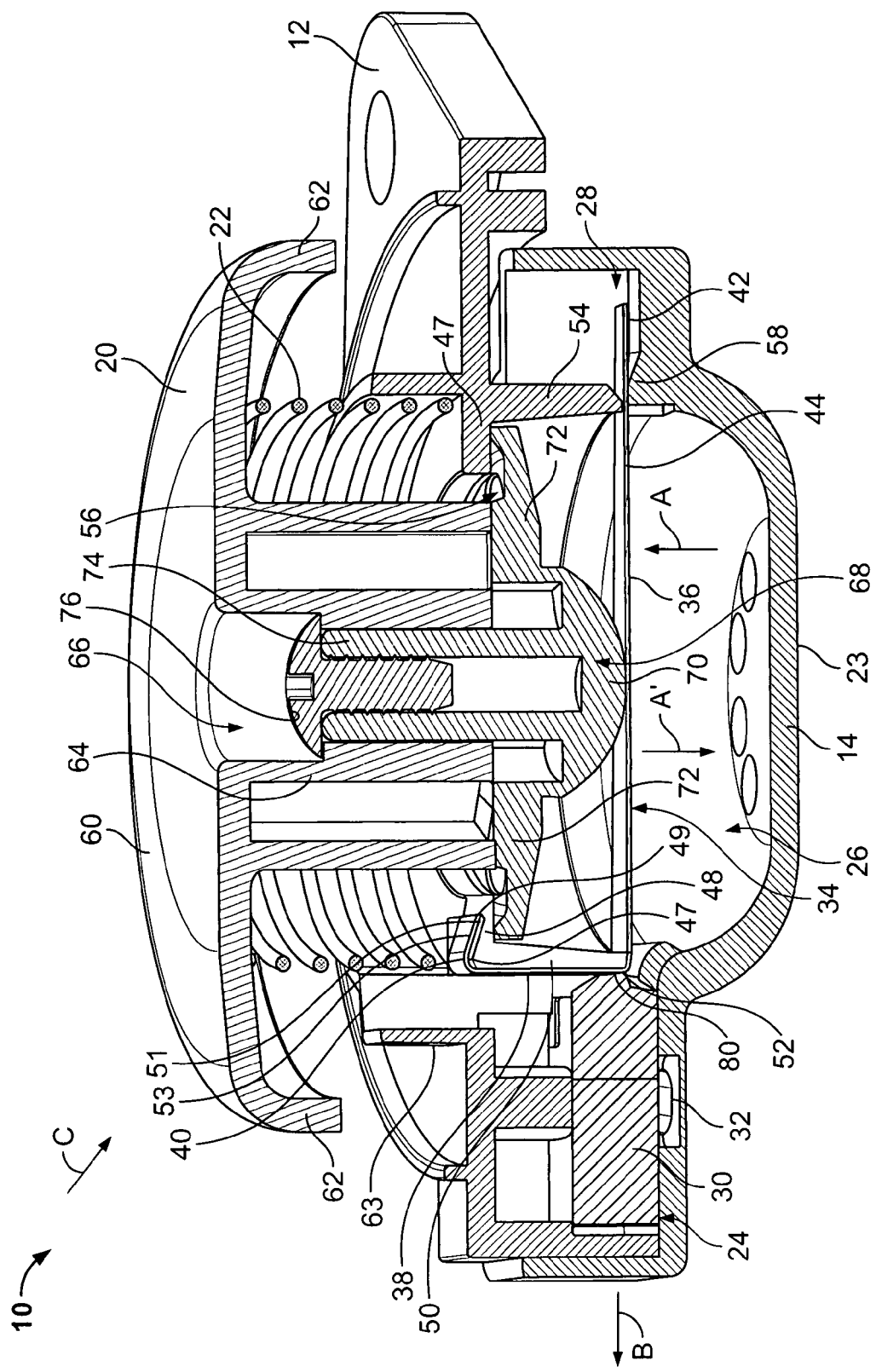
FIG. 2 illustrates an isometric cross-sectional internal view of a seat switch assembly according to an embodiment of the present invention.

FIG. 2 illustrates an isometric cross-sectional internal view of a seat switch assembly 10. A mid-section of the bottom cover 14 downwardly protrudes to form a basin 23. A switch chamber 24 is defined between the base 12 and one end of the bottom cover 14. A spring chamber 26 is also defined between the base 12 and the bottom cover 14 and is adjacent the switch chamber 24. As shown in FIG. 2, the spring chamber 26 may span the distance of the basin 23. Additionally, a tip chamber 28 is defined between the base 12 and the bottom cover 14 and is distally located from the switch chamber 24. Thus, the switch chamber 24 is located on one side of the spring chamber 26, while the tip chamber 28 is located on the other side of the spring chamber 26. While the base 12 and the bottom cover 14 are shown as two separate components, the base 12 and the bottom cover 14 may, optionally, be integrally formed as a single unit.

A switch 30 is secured within the switch chamber 24. The switch 30 may be sealed within the switch chamber 24 by the base 12 and the bottom cover 14. Thus, the switch 30 may be completely within the seat switch assembly 10 such that no portion of the switch 30 extends out of the seat switch assembly 10. The switch 30 includes an electrical input 32 configured to be connected to an electrical wire, contact, or the like of an ignition circuit of a vehicle.

Figure 3:
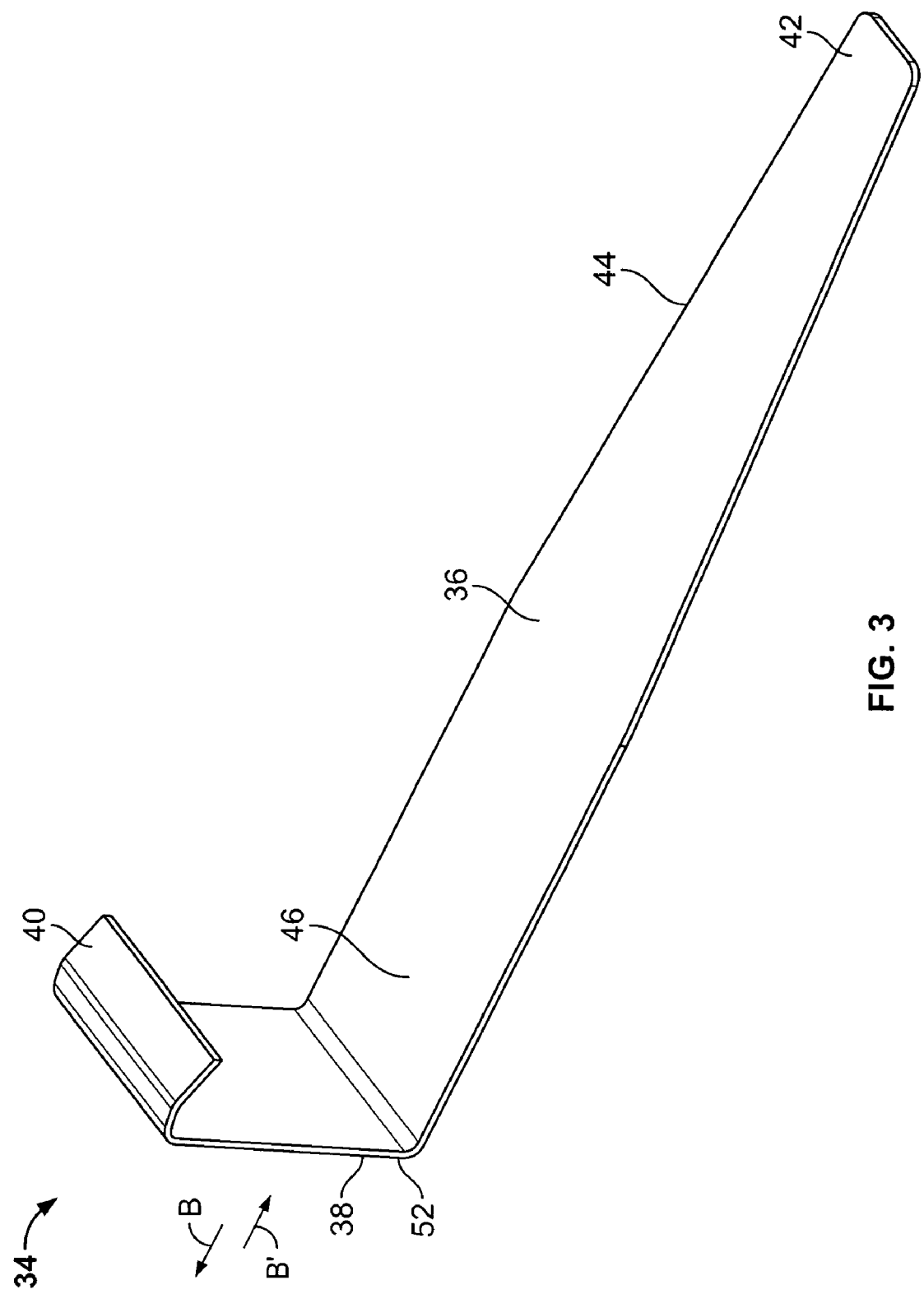
FIG. 3 illustrates an isometric top view of a flat spring according to an embodiment of the present invention.

FIG. 3 illustrates an isometric top view of a flat spring 34 according to an embodiment of the present invention. The flat spring 34 includes a horizontal elongated beam 36 integrally connected to an upright beam or post 38. An upper end of the upright beam 38 is, in turn, integrally connected to a downwardly bent clip 40.

As shown in FIG. 3, the elongated beam 36 tapers toward a tip 42. Thus, the distal portion 44 of the beam 36 may bow and flex easier than the proximal portion 46 of the beam 36 that is closer to the upright beam 38. Because the proximal portion 46 includes more material than the distal portion 44, the proximal portion 46 is stiffer than the distal portion 44.

Referring again to FIG. 2, the bent clip 40 is secured over a top surface of a ledge 47 (or other such support point) of an interior support wall 48 of the base 12. A downwardly angled groove 49, which provides a clearance 51 for a small degree of rotation about the ledge 47, may be formed in the ledge 47. That is, the short clearance area 51 may exist between a distal end 51 of the bent clip 40 and the groove 49 of the ledge 47 to allow for the bent clip 40 to pivotally deflect about the ledge 47, which serves as a pivot point. The bent clip 40 is secured into the groove 49 so that a portion of the bent clip 40 abuts the ledge 47, while a clearance area exists between the ledge 47 and the distal tip of the bent clip 40. The downward cant of the bent clip 40 ensures that the bent clip 40 remains secured to the support wall 48. Additionally, the coil spring 22 may abut into the bent clip 40, thereby exerting a compressive force into the bent clip 40. The force exerted into the bent clip 40 by the coil spring 22 may also serve to maintain the position of the bent clip 40 with respect to the ledge 47 and against the vertical wall 50 due to a short offset between the ledge 47 and the point of contact of the coil spring 22.

In the deactivated position, the upright beam 38 conforms to a lateral surface 50 of the support wall 48 of the base 12. As mentioned above, the flat spring 34 is secured to the support wall 48 by way of the bent clip 40 securing to or over the ledge 47 and being trapped under the coil spring 22. The upright beam 38 does not, however, fasten to the lateral surface 50 of the support wall 48. Instead, the upright beam 38 overlays the lateral surface 50. A lower end 52 of the upright beam 38 is positioned between the lateral surface 50 of the support wall 48 and the switch 30.

The elongated beam 36 of the flat spring 34 spans between the interior support wall 48 through the spring chamber 26 to an interior support wall 54 of the base 12 located opposite the support wall 48. The support walls 48 and 54 are part of a circumferential support wall structure that defines a central channel 56 through the base 12.

The distal end 44 of the beam 36 is restrained between the support wall 50 and an upper ridge 58 of the basin 23. The tip 42 of the flat spring 34 extends into the tip chamber 28.

The top cover 20 includes an upper wall 60 having downwardly curved outer edges 62. As shown in FIG. 2, the coil spring 22 is positioned underneath the top cover 20 and the ledge 47. A retaining wall 63 upwardly extends from the base 12 and surrounds a circumference of the coil spring 22. The retaining wall 63 ensures that the coil spring 22 does not shift with respect to the base 12. Additionally, the curved edges 62 of the top cover 22 ensure that the coil spring 22 does not eject from the top cover 22. A column 64 downwardly extends from the top cover 20. A washer channel 66 is formed through the column 64.

A washer 68 securely fastens to the top cover 20 through the washer channel 66. The top cover 20 and the washer 68 form an actuation member configured to move into the flat spring 34. The washer 68 includes a semi-spherical central protuberance 70 integrally connected to a circumferential flange 72 that outwardly extends from the protuberance 70. A central column 74 upwardly extends from the protuberance 70 and is securely positioned within the washer channel 66. A fastener 76, such as a screw or bolt, is used to securely fasten the top cover 20 to the washer 68. Alternatively, the washer 68 and the top cover 20 may be integrally formed as a single unit.

The top cover 20 is secured to the base 12 by way of the circumferential flange 72 of the washer 68 being compressively sandwiched underneath the ledge 47 of the interior support walls 48 and 54. The flat spring 34 exerts a resistive force into the protuberance 70 of the washer 68 in the direction of arrow A that pushes the washer 68 in the same direction. Thus, the flange 72 is forced into an underside of the ledge 47.

The coil spring 22 is positioned between an underside of the top cover 20 and a top surface of the ledge 47 that surrounds the central channel 56 formed through the base 12. The coil spring 22 exerts a resistive force into the top cover 20 in the direction of arrow A, and a resistive force into the ledge 47 in the direction of arrow A'.

In operation, when an operator engages the top cover 20, such as by sitting on a vehicle seat, the top cover 20 moves down in the direction of arrow A', thereby compressing the coil spring 22 between the top cover 20 and the ledge 47 of the base 12. As the top cover 20 moves in the direction of arrow A', the protuberance 70 is forced downward into the elongated beam 36 of the flat spring 34. The movement of the protuberance 70 into the beam 36 downwardly bows the beam 36. The basin 23 of the bottom cover 14 provides adequate space for the beam 36 to bow. As the beam 36 downwardly bows, the upright beam 38 laterally swings in the direction of arrow B about the pivot point defined between the ledge 47 and the bent clip 40. The upright beam 38 is thus moved into an activation contact 80 of the switch 30. Engagement of the activation contact 80 activates the switch 30 to complete an ignition circuit. Thus, the machinery, such as a lawn mower, may be activated.

If force is exerted into the top cover 20 in an angled direction, such as shown by arrow C, the protuberance 70 still moves downwardly into the flat spring 34 in the direction of arrow A'. In this situation, the top cover 20 may exert an angled force with respect to the base 12. However, the force is transferred to the washer 68, and the circumferential flange 72 pivots with respect to the ledge 47 to counteract the angled force, thereby ensuring that the protuberance 70 is downwardly directed toward the center of the beam 36 in the direction of arrow A'. Thus the switch assembly 10 transmits the motion of the top cover 20 to the switch 30 from any angle of actuation.

Figure 4:
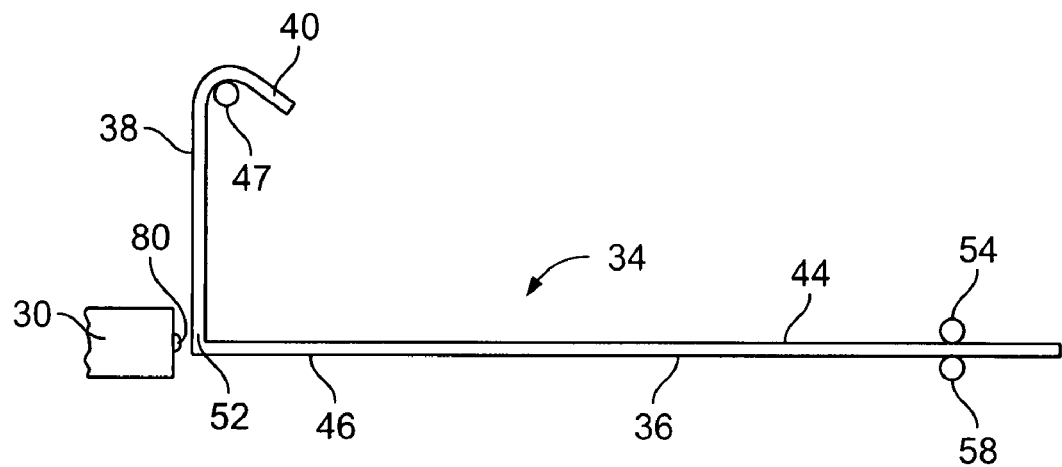
FIG. 4 illustrates a side view of a flat spring in a non-deflected position according to an embodiment of the present invention.

FIG. 4 illustrates a simplified side view of the flat spring 34 in a non-deflected position according to an embodiment of the present invention. In this position, the elongated beam 36 is substantially straight and horizontal. Also, the upright beam 38 is substantially straight and vertical.

Figure 5:
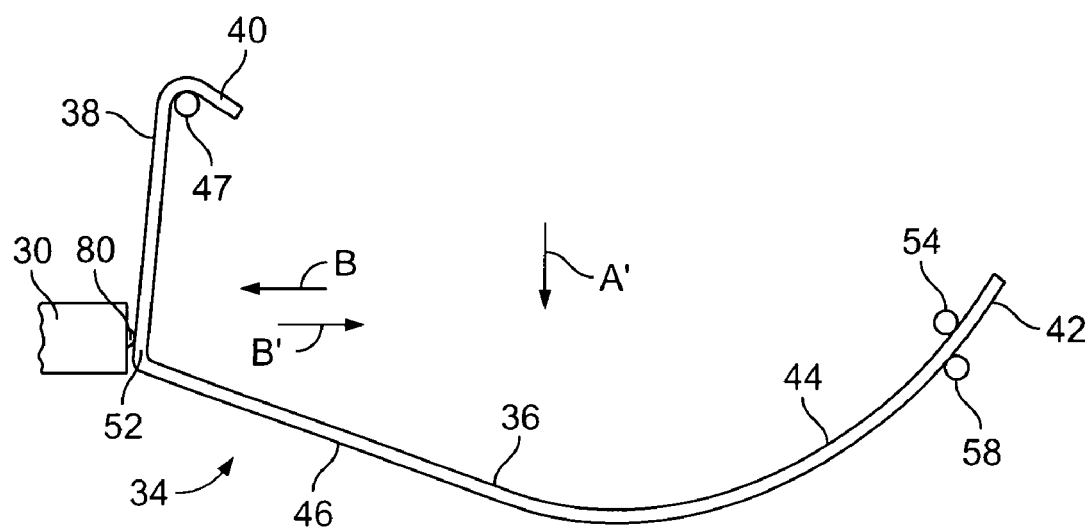
FIG. 5 illustrates a side view of a flat spring in a deflected position according to an embodiment of the present invention.

FIG. 5 illustrates a simplified side view of the flat spring 34 in a deflected position according to an embodiment of the present invention. When force is applied to the elongated beam 36, such as through the washer 68 (shown in FIG. 3), in the direction of arrow A', the elongated beam 36 downwardly bows, thereby forcing the upright beam to swing sideways about the ledge 47, which acts as a pivot point, in the direction of arrow B. The upright beam 38 pivotally deflects in the direction of arrow B about the pivot point defined by the ledge 47 due to the moment arm defined by the contact point of the protuberance 70 (shown in FIG. 2) and the bent clip 40 over the ledge 47.

As shown in FIG. 5, the tip 42 of the flat spring 34 is restrained or otherwise contained between the interior support wall 54 of the base 12 (shown in FIG. 2) and the upper ridge 58 of the basis 23 (shown in FIG. 2). Because the flat spring 34 is resilient, when the flat spring 34 bows or otherwise deflects, the restrained tip 42 exerts a resistive force that tends to bring the flat spring 34 back to its at-rest position. That is, the pivoting nature of the tip 42 exerts a pulling force into the flat spring 34 that tends to flatten the beam 36 and move the beam 38 in the direction of B'. Thus, when force is no longer applied to the flat spring 34 in the direction of arrow A', the force exerted by the restrained tip 42 flexes the flat spring 34 back to its at-rest position, in which the upright beam 38 does not exert an activating force into the switch 30 (shown in FIG. 3). As such, the flat spring 34 provides a fail-safe mechanism that ensures the ignition circuit is disconnected when an activating force is no longer applied to the seat switch assembly 10 (shown in FIGS. 1-2).

Referring to FIGS. 3-5, because the beam 36 tapers toward the tip 42, the distal portion 44 is allowed to deflect more than the proximal portion 46. The net effect of increasing bowing toward the tip 42 imparts a more immediate and direct sideway displacement in the direction of arrow B due to the deflection and resultant force of the distal portion 44 being transferred to the stiffer proximal portion 46. While the stiffer proximal portion 46 does not deflect or bow as much the tapered distal portion 44, the proximal portion 46 quickly and efficiently transfers the lateral movement component of the distal portion 44 to the upright beam 38, which responsively rotates in the direction of arrow B. Thus, engagement of the top cover 20 (shown in FIGS. 1 and 2) is quickly and efficiently transferred to the switch 30 (shown in FIG. 2).

Referring to FIGS. 1-5, when force is no longer applied to the top cover 20 in the direction of arrow A', the flat spring 34, because it is resilient, returns to its original position. Thus, the elongated beam 36 flattens out, and the upright beam 38 moves away from the switch 30, thereby disconnecting the ignition circuit. As the elongated beam 36 flattens out, it exerts an upwardly directed force into the protuberance 70 in the direction of arrow A. The force exerted into the protuberance 70 moves the washer 68, and therefore the top cover 20 in the direction of arrow A. At the same time, the coil spring 22 decompresses and pushes the top cover 20, and therefore the washer 68, in the direction of arrow A. Thus, the flat spring 34 no longer exerts an activating force into the switch 30, and the top cover 20 is moved back into a disengaged position.

Thus, embodiments of the present invention provide an improved seat switch assembly that does not include exposed switch contacts. As shown in FIG. 2, for example, the switch 30 is completely disposed within the seat switch assembly 10. Thus, the switch 30 is protected from foreign objects, substances and contaminants.

Additionally, embodiments of the present invention provide a seat switch assembly with a lower mounting profile than existing seat switch assemblies. Because the switch 30 is laterally disposed within the assembly 10, the vertical profile of the assembly 10 is relatively small.

Further, embodiments of the present invention provide a fail-safe seat switch assembly. When force is no longer applied to the top cover 20, the resilient flat spring 34, as described above, flexes or springs back to an at-rest position in which the switch 30 is no longer engaged.

While various spatial terms, such as front, rear, upper, bottom, lower, mid, lateral, horizontal, vertical, and the like may used to describe embodiments of the present invention, it is understood that such terms are merely used with respect to the orientations shown in the drawings. The orientations may be inverted, rotated, or otherwise changed, such that a front portion is a rear portion, and vice versa, horizontal becomes vertical, and the like.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

The invention claimed is:

1. A switch assembly comprising:
   a base having a central channel;
   a flat spring pivotally secured to a portion of said base;
   a switch proximate said flat spring, said switch configured to selectively open and close a circuit; and
   an actuating member positioned through said central channel and abutting said flat spring, said actuating member being configured to be engaged toward said flat spring in order to activate said switch, wherein movement of said actuating member in a first direction causes at least a portion of said flat spring to move in a second direction into said switch to activate said switch, and wherein said first direction is perpendicular to said second direction;
   wherein said flat spring comprises an elongated beam integrally connected to a post which is, in turn, integrally connected to a bent clip, said elongated beam having a distal tip secured to a portion of said base, said bent clip secured to another portion of said base, wherein said elongated beam bows in said first direction when engaged by said actuating member, thereby causing said post to deflect in said second direction into said switch.

2. The switch assembly of claim 1, wherein said elongated beam tapers toward said tip.

3. The switch assembly of claim 1, further comprising a first cover secured to said base, wherein said switch is protectively secured between said base and said first cover.

4. The switch assembly of claim 1, wherein said actuating member comprises a second cover secured to a washer, and wherein a coil spring is positioned between said second cover and said base.

5. The switch assembly of claim 4, wherein said washer comprises a central protuberance connected to a circumferential flap that is pivotally biased into said base.

6. The switch assembly of claim 5, wherein said circumferential flap is biased into interior edges of said base that define said central channel.

7. The switch assembly of claim 5, wherein when said actuating member is disengaged, said at least a portion of said flat spring returns to an at-rest position in which said flat spring moves into a deactivation position with respect to said switch.

8. A switch assembly comprising:
   a base having a central channel;
   a first cover secured to said base;
   a switch configured to selectively open and close an activation circuit, said switch being completely disposed between said base and said first cover;
   a spring member secured to a portion of said base; and
   an actuating member positioned through said central channel and abutting said spring member, said actuating member being configured to be engaged toward said spring member in order to urge a portion of said spring member into abutment with said switch, thereby activating said switch;
   wherein said spring member is a flat spring comprising an elongated beam integrally connected to a post which is, in turn, integrally connected to a bent clip, said elongated beam having a distal tip secured to a portion of said base, said bent clip secured to another portion of said base, wherein said elongated beam bows in a first direction when engaged by said actuating member, thereby causing said post to deflect in a second direction into said switch, which is perpendicular to said first direction.

9. The switch assembly of claim 8, wherein said elongated beam tapers toward said tip.

10. The switch assembly of claim 8, wherein said actuating member comprises a second cover secured to a washer, and wherein a coil spring is positioned between said second cover and said base.

11. The switch assembly of claim 10, wherein said washer comprises a central protuberance connected to a circumferential flap that is pivotally biased into said base.

12. The switch assembly of claim 11, wherein said circumferential flap is biased into interior edges of said base that define said central channel.

13. The switch assembly of claim 8, wherein when said actuating member is disengaged, said portion of said spring member returns to an at-rest position in which said spring member moves away from an activating position with respect to said switch.

14. A switch assembly configured to be positioned within a seat of a vehicle, wherein the switch assembly operates to activate operation of the vehicle when an operator is seated, and wherein the switch assembly operates to deactivate operation of the vehicle when the operator dismounts from the seat, the switch assembly comprising:
   a base having a circumferential support wall having a ledge positioned around a central channel;
   a flat spring pivotally secured to a portion of said base, said flat spring comprising an elongated beam integrally connected to a post which is, in turn, integrally connected to a bent clip, said elongated beam having a distal tip secured to a portion of said support wall, said bent clip secured to a portion of said ledge distally located from said distal tip;
   a switch proximate said flat spring, said switch configured to selectively open and close a circuit; and
   an actuating member positioned through said central channel and abutting said flat spring, said actuating member being configured to be engaged toward said flat spring in order to activate said switch, wherein movement of said actuating member in a first direction causes said elongated beam to move in said first direction, thereby causing said post to move in said second direction into said switch.

15. The switch assembly of claim 14, wherein said elongated beam tapers toward said tip.

16. The switch assembly of claim 14, further comprising a first cover secured to said base, wherein said switch is protectively located within a switch chamber defined between said base and said first cover.

17. The switch assembly of claim 14, wherein said actuating member comprises a second cover secured to a washer, and wherein a coil spring is positioned between said second cover and said base, wherein said washer comprises a central protuberance connected to a circumferential flap that is pivotally biased into said base.

18. The switch assembly of claim 17, wherein said circumferential flap is biased into interior edges of said base that define said central channel.

19. The switch assembly of claim 14, wherein when said actuating member is disengaged, said flat spring returns to an at-rest position in which said post moves away from an activating position with respect to said switch.

* * * * *